US011350158B2

(12) United States Patent
Shin et al.

(10) Patent No.: US 11,350,158 B2
(45) Date of Patent: May 31, 2022

(54) ELECTRONIC DEVICE AND CONTROL METHOD THEREOF

(71) Applicant: SAMSUNG ELECTRONICS CO., LTD., Suwon-si (KR)

(72) Inventors: Hyunjong Shin, Suwon-si (KR); Yongsik Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/267,935

(22) PCT Filed: May 14, 2019

(86) PCT No.: PCT/KR2019/005785
§ 371 (c)(1),
(2) Date: Feb. 11, 2021

(87) PCT Pub. No.: WO2020/054941
PCT Pub. Date: Mar. 19, 2020

(65) Prior Publication Data
US 2021/0185389 A1    Jun. 17, 2021

(30) Foreign Application Priority Data
Sep. 11, 2018  (KR) .................. 10-2018-0108386

(51) Int. Cl.
*H04N 7/18* (2006.01)
*H04N 21/4363* (2011.01)
*H04N 21/443* (2011.01)

(52) U.S. Cl.
CPC ... *H04N 21/43635* (2013.01); *H04N 21/4433* (2013.01); *H04N 21/4436* (2013.01)

(58) Field of Classification Search
CPC ......... H04N 21/43635; H04N 21/4433; H04N 21/4436; H04N 21/44227; H04N 21/4432; H04N 21/43615
See application file for complete search history.

(56) References Cited

U.S. PATENT DOCUMENTS 8,255,580 B2    8/2012  Kang et al.
8,352,642 B2    1/2013  Hsu et al.
(Continued)

FOREIGN PATENT DOCUMENTS

CN         102469289       7/2014
KR     10-2007-0019107     2/2007
(Continued)

OTHER PUBLICATIONS

International Search Report for PCT/KR2019/005785 (with English translation), dated Aug. 23, 2019, 4 pages.
(Continued)

*Primary Examiner* — Mulugeta Mengesha
(74) *Attorney, Agent, or Firm* — Nixon & Vanderhye, P.C.

(57) ABSTRACT

An electronic device is disclosed. The device includes a memory, a communication interface, and a processor configured to change, based on an event for turning off the electronic apparatus, first information indicating support for a fixed rate link (FRL) in EEID information stored in the memory into second information indicating no support for the FRL, and provide the second information to a source device connected through the communication interface.

10 Claims, 10 Drawing Sheets

(56) References Cited

U.S. PATENT DOCUMENTS

| | | | | |
|---|---|---|---|---|
| 10,327,049 B2* | 6/2019 | Suzuki | ............. | H04B 10/25891 |
| 2007/0036158 A1 | 2/2007 | Hun-Kwon et al. | | |
| 2012/0163609 A1 | 6/2012 | Lee et al. | | |
| 2014/0132615 A1* | 5/2014 | Lee | ........................... | G06T 1/60 |
| | | | | 345/541 |
| 2018/0048848 A1* | 2/2018 | Park | ................ | H04N 21/44231 |
| 2019/0172413 A1* | 6/2019 | Park | ................... | H04N 21/4436 |
| 2020/0351465 A1* | 11/2020 | Wolff | ....................... | H04R 3/00 |

FOREIGN PATENT DOCUMENTS

| | | | | |
|---|---|---|---|---|
| KR | 10-2009-0051445 | | 5/2009 | |
| KR | 10-2012-0072254 | | 7/2012 | |
| KR | 10-2014-0060141 | | 5/2014 | |
| KR | 10-2016-0026075 | | 3/2016 | |
| KR | 10-2016-0042229 | | 4/2016 | |
| KR | 10-1743173 | | 6/2017 | |
| KR | 10-2018-0015428 | | 2/2018 | |
| WO | 2017/151925 | | 9/2017 | |
| WO | WO-2017151925 A1 * | 9/2017 | ....... | H04N 21/43635 |

OTHER PUBLICATIONS

Written Opinion of the ISA for PCT/KR2019/005785 (with English translation), dated Aug. 23, 2019, 11 pages.

* cited by examiner

FIG. 2

| Byte\Bit # | 7 | 6 | 5 | 5 | 5 | 5 | 1 | 0 |
|---|---|---|---|---|---|---|---|---|
| 0 | Vendor Specific Tag Code (=3) | | | Length (=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | PR_Capable | Rsvd(0) | CCBPCI | LTE_340Mcsc_scramble | Independent_view | Dual_View | 3D_OSD_Disparity |
| 7 | Max_FRL_Rate | | | | DC_48bit_420 | DC_36bit_420 | DC_30bit_420 | |
| 8 | Rsvd(0) | Rsvd(0) | M_Delta | CinemaVRR | Rsvd(0) | FVA | ALLM | FAPA_start_location |
| 9 | VRR_MAX[9:8] | | | VRR_MIN | | | | |
| 10 | VRR_MAX[7:0] | | | | | | | |
| 11 | DSC_1p2 | DSC_Native_420 | Rsvd(0) | Rsvd(0) | DSC_All_bpp | DSC_16bpc (=0) | DSC_12bpc | DSC_10bpc |
| 12 | DSC_Max_FRL_Rate | | | | | DSC_MaxSlices | | |
| 13 | Rsvd(0) | Rsvd(0) | DSC_TotalChunkKBytes | | | | | |
| 14...N | Reserved(0)* | | | | | | | |

ELECTRONIC DEVICE AND CONTROL METHOD THEREOF

This application is the U.S. national phase of International Application No. PCT/KR2019/005785 filed 14 May 2019, which designated the U.S. and claims priority to KR Patent Application No. 10-2018-0108386 filed 11 Sep. 2018, the entire contents of each of which are hereby incorporated by reference.

FIELD

The disclosure relates to an electronic apparatus, and a control method thereof. More particularly, the disclosure relates to an electronic apparatus that communicates with an external device and a control method thereof.

DESCRIPTION OF RELATED ART

As the content of Ultra HD-level resolution increases beyond full high definition (HD) resolution, sink devices and source devices equipped with HDMI ports supporting HDMI 2.1 version are gradually spreading.

HDMI 2.1 version uses FRL output format instead of TMDS. However, the FRL output format is inconvenient in that it does not output a clock signal used to identify a power status of a source device.

SUMMARY

The disclosure is to provide an electronic apparatus capable of identifying a power status of a source device by changing stored EDID information and a control method thereof.

According to an embodiment of the disclosure, an electronic apparatus includes a memory, a communication interface, and a processor configured to change, based on an event for turning off the electronic apparatus, first information indicating support for a fixed rate link (FRL) in EDID information stored in the memory into second information indicating no support for the FRL, and provide the second information to a source device connected through the communication interface.

The processor may be configured to change a hot plug detect signal related to the communication interface from a low status to a high status and enter a standby mode.

The processor may be configured to, based on the electronic apparatus being turned on, identify a power status of the source device based on clock signal information output from the source device.

The processor may be configured to, based on the source device being identified as being turned off, transmit a control signal for turning on the source device, change the second information into the first information and change the hot plug detect signal related to the communication interface from the low status to the high status.

The processor may be configured to transmit the control signal to an external device that performs communication with the source device, or transmit the control signal to the source device.

The apparatus may further include a Micom, wherein the Micom is configured to, based on the processor entering a standby mode, monitor a clock signal output from the source device connected through the communication interface.

The clock signal may be transition minimized differential signaling (TMDS) clock signal.

The electronic apparatus and the source device may support high-definition multimedia interface (HDMI) 2.1 or higher, and wherein the HDMI 2.1 or higher supports both TMDS and FRL.

According to an embodiment of the disclosure, an electronic system comprising a source device and a sink device, the system includes a source device, and a sink device configured to change, based on an event for turning off the electronic apparatus, first information indicating support for a fixed rate link (FRL) in EDID information stored in a memory into second information indicating no support for the FRL, and provide the second information to a source device connected through a communication interface.

The sink device may be configured to change a hot plug detect signal related to the communication interface from a low status to a high status and enter a standby mode.

The sink device may be configured to, based on the electronic apparatus being turned on, identify a power status of the source device based on clock signal information output from the source device.

The sink device may be configured to, based on the source device being identified as being turned off, transmit a control signal for turning on the source device, change the second information into the first information and change the hot plug detect signal from the low status to the high status, and wherein the source device is configured to read EDID information stored in a memory of the sink device, and output an image signal based on the first information included in the EDID information.

The source device may be configured to, based on the hot plug detect signal being changed from a low status into a high status, output an image signal to the memory of the sink device.

A method of controlling an electronic apparatus includes, based on an event for turning off the electronic apparatus, changing first information indicating support for a fixed rate link (FRL) in EDID information stored in a memory into second information indicating no support for the FRL, and providing the second information to a source device connected through a communication interface.

The method may further include changing a hot plug detect signal related to the communication interface from a low status to a high status and entering a standby mode.

The method may further include based on the electronic apparatus being turned on, identifying a power status of the source device based on clock signal information output from the source device.

The method may further include monitoring a clock signal output from the source device connected through the communication interface in the standby mode.

The method may further include identifying a power status of the source device based on the monitoring information of the clock signal, based on the electronic apparatus being turned on.

The method may further include, based on the source device being identified as being turned off, transmitting a control signal for turning on the source device, and changing the hot plug detect signal related to the communication interface from a low status to a high status after changing the second information into the first information.

The changing may be configured to transmit the control signal to an external device that performs communication with the source device, and transmit the control signal to the source device.

The clock signal may be transition minimized differential signaling (TMDS) clock signal.

The electronic apparatus and the source device may support high-definition multimedia interface (HDMI) 2.1 or higher, and wherein the HDMI 2.1 or higher supports both TMDS and FRL.

As described above, according to various embodiments of the disclosure, even if a source device is a device that supports FRL, the sink device can identify a power status of the source device, and the user can view an optimal UHD screen or HDR screen.

BRIEF DESCRIPTION OF THE DRAWINGS

FIG. 2 is a view illustrating a VSDB according to an embodiment of the disclosure;

DETAILED DESCRIPTION OF EXAMPLE EMBODIMENTS

Figure 1:
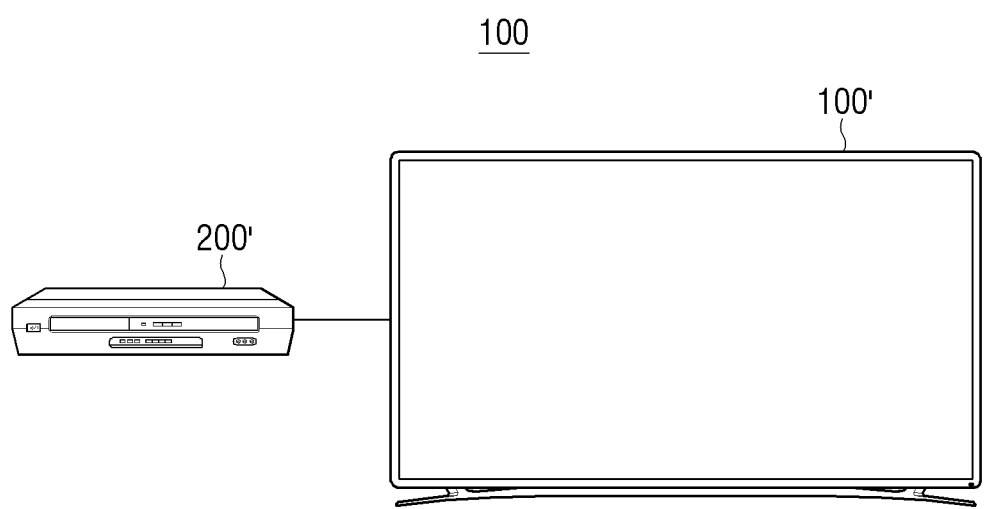
FIG. 1 is a configuration diagram illustrating an electronic system according to an embodiment of the disclosure.

Hereinafter, the disclosure will be described in detail with reference to the accompanying drawings.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The expression at least one of A and B is to be understood as representing either "A" or "B" or "A and B".

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Exemplary embodiments are described in greater detail below with reference to the accompanying drawings.

FIG. 1 is a configuration diagram illustrating an electronic system according to an embodiment of the disclosure.

As illustrated in FIG. 1, an electronic system 1000 includes a sink device 100' and a source device 200'.

The source device 200' provides content to the sink device 100'. The source device 200' may be implemented as various types of electronic apparatuses capable of providing contents to the sink device 100', such as a set-top box, a DVD player, a Blu-ray disc player, a PC, a game console, or the like. The sink device 100' may be implemented as various types of electronic apparatuses capable of outputting content provided from the source device 200' such as a network TV, smart TV, Internet TV, web TV, internet protocol television (IPTV), signage, a PC, or the like.

In particular, the sink device 100' may be implemented as a device that supports high-speed multimedia interface (HDMI). Accordingly, the sink device 100' and the source device 200' may have an HDMI port and communicate with each other through the corresponding port. For example, the sink device 100' and the source device 200' may include an HDMI 2.1 port. The HDMI 2.0 is a standard optimized for ultra-high resolution or higher environments called 4K or ultra-HD (UHD). A maximum bandwidth has been improved up to 48 Gbps, and ultra-high-definition HDR content (10-bit color encoding) may be transmitted without problems up to 144 Hz. In addition, 8K (7680×4320) content, the next generation of 4k, may also be transmitted uncompressed up to 30 Hz.

The source device 200' may provide the corresponding content to the sink device 100' based on EDID information received from the sink device 100'. The EDID is a standard for transmitting display information from the sink device 100', that is a display side, to the source device 200', that is a host side. The meaning of EDID does not define an interface signal like a display data channel (DDC), but rather defines a data format for allowing the host to read capabilities of the display. EDID may include information on a manufacturer's name, product manufacturing year/month, product type, EDID version, product's resolution and color coordinates, phosphor or filter type, timing, screen size, luminance, pixels, or the like.

In particular, the HDMI standard is configured to store resolution information and color information of the sink device 100' through a vender specific data block (VSDB), and allow the source device 200' to read the VSDB information and transmit the corresponding content to the sink device 100'.

For example, referring to the VSDB shown in FIG. 2, a block is classified using an IEEE code and includes color bit information 21, maximum TMDS frequency information 22, audio/video latency information, or the like. The color bit information 22 may refer to color information, and the highest transition minimized differential signaling (TMDS) frequency information 23 means resolution information. This is because as the higher the maximum TMDS clock frequency, the greater the amount of data that can be transmitted, thereby transmitting high resolution data accordingly. The source device 200' may, through the VSDB including such information, identify what format signals can be received and output by the sink device 100' through the HDMI port, and may transmit content to a signal format corresponding thereto.

Figure 3:
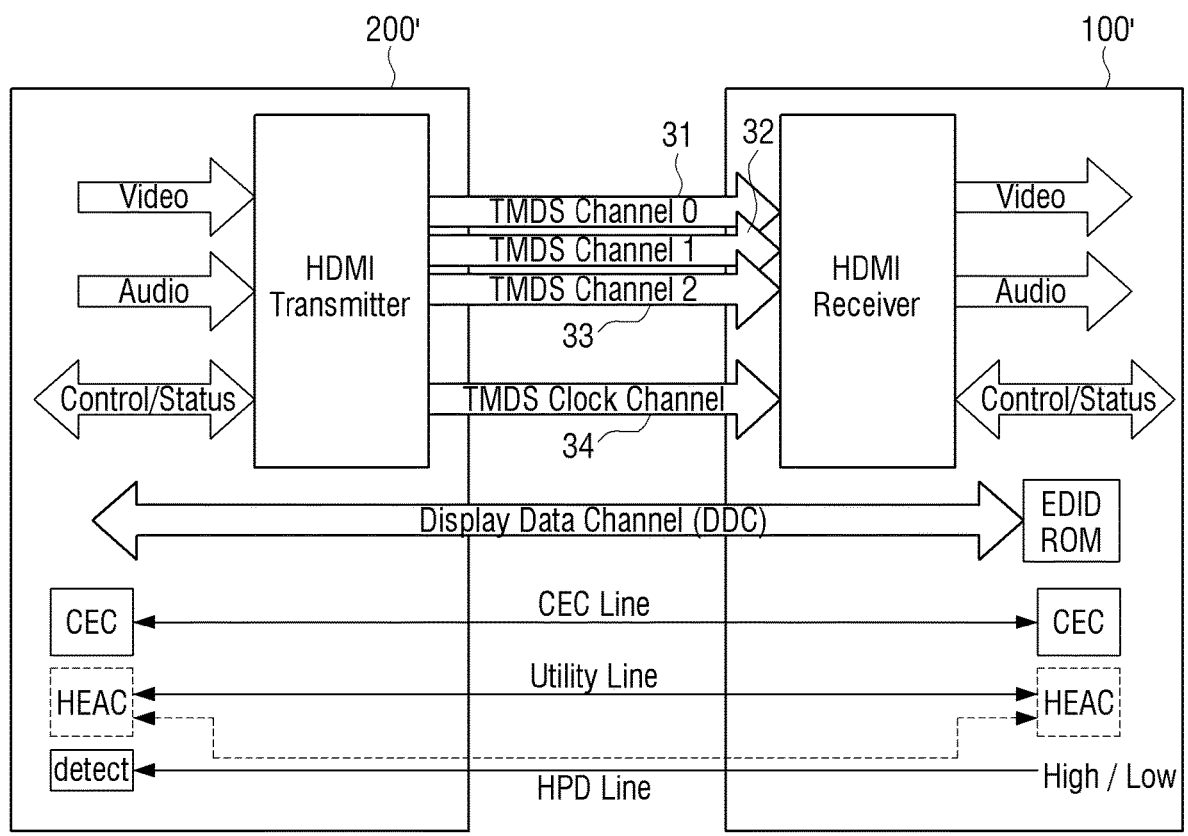
FIG. 3 is a view illustrating a TMDS according to an embodiment of the disclosure.

Meanwhile, when the sink device 100' is in a standby mode (standby status), when the source device 200' is a turn-off status by monitoring a status of turning on/off the source device 200', a function of allowing the source device 200' to be turned on together is used. Specifically, when the sink device 100' monitors TMDS clock signal and the sink device 100' is turned on, an auto clock detection function that the source device 200' turns on when the source device 200' is turned off, and maintains that status when the source device 200' is turned on is provided. For example, as shown in FIG. 3, TMDS may be provided through Data0±lane 31, Data1±lane 32, Data2±lane 33, and Clock±lane 34, and the sink device 100' may identify the power status of the source device 200' by monitoring the TMDS clock signal provided by the Clock±lane 34. This is because the TMDS clock signal is a regular type signal unlike the TMDS data signal.

However, in HDMI 2.1 version, the FRL output format is used instead of TMDS. For example, as shown in FIG. 2, FRL-related information 23 is included and transmitted to one area of the VSDB. Accordingly, the HDMI 2.1 or higher version may support both TMDS and FRL.

FRL is composed of Data0±, Data1±, Data2±, and Data3± (Data0/1/2/3 or Data0/1/2 signals can be output depending on a mode), and there is no separate Clock±lane. The information corresponding to the clock is embedded in data, and the clock is acquired by using a clock and data recovery (CDR) technology in the sink device 100'. As such, since a physical clock signal does not exist in the FRL, it is difficult to monitor and identify the power on/off status of the source device 200'.

Accordingly, hereinafter, even when a source device and a sink device supporting version 2.1 are connected, various embodiments that automatically changes and provides EDID information so that the power on/off status of the source device can be monitored and identified will be described.

Figure 4:
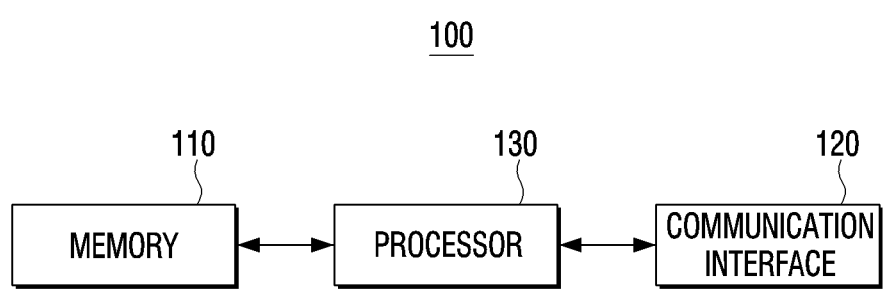
FIG. 4 is a block diagram illustrating a configuration of an electronic apparatus according to an embodiment of the disclosure.

FIG. 4 is a block diagram illustrating a configuration of an electronic apparatus according to an embodiment of the disclosure.

As illustrated in FIG. 4, the electronic apparatus 100 includes a memory 110, a communication interface 120, and a processor 130. The electronic apparatus 100 may be implemented as the sink device 100' shown in FIG. 1. According to an embodiment, the electronic apparatus 100 may be implemented in a form in which content is directly output by having a display. However, when the display is separately provided, the electronic apparatus 100 may be implemented in a form in which the content is reproduced and provided as a display.

The memory 110 stores EDID information. The EDID information may include extended display identification data (EDID) information of a first HDMI version and EDID information of a second HDMI version. The EDID of the first HDMI version may include a vendor-specific data block (VSDB) defined in the HDMI standard, and the EDID information of the second HDMI version may include an HDMI Forum (HF)-VSDB. The EDID information may include various information related to the electronic apparatus 100 as described with reference to FIG. 2.

The memory 110 may be implemented as a memory that can read and write, and can be accessed by an external source device (for example, 200' in FIG. 1). For example, the memory 110 may be implemented as an internal memory such as ROM (e.g., electrically erasable programmable read-only memory (EEPROM)) or RAM included in the processor 130, or may be implemented as a separate memory from the processor 130. In this case, the memory 110 may be implemented in a form of a memory embedded in the electronic apparatus 100 or may be implemented in a form of a memory that is detachable to the electronic apparatus 100 according to a purpose of data storage. For example, data for driving the electronic apparatus 100 may be stored in a memory embedded in the electronic apparatus 100, and data for an extension function of the electronic apparatus 100 may be stored in the memory detachable to the electronic apparatus 100. Meanwhile, the memory embedded in the electronic apparatus 100 may be implemented in a form of a flash memory, a nonvolatile memory, a volatile memory, a hard disk drive (HDD), a solid status drive (SSD), or the like, and the memory detachable to a sound output device may be implemented in a form of a memory card (e.g., micro SD card, USB memory, etc.), an external memory connectable to a USB port (e.g., USB memory), or the like.

The communication interface 120 communicates with an external device (not shown). The external device (not shown) may be implemented as the source device 200' shown in FIG. 1. Hereinafter, for convenience of description, it is assumed that the external device is implemented as the source device 200' shown in FIG. 1.

The communication interface 120 may be implemented as an HDMI port through which high-resolution video and multi-channel digital audio can be transmitted from the external device 200' through a single cable. Specifically, the communication interface 120 includes a transition minimized differential signaling (TMDS) channel that receives video and audio signals, device information, video or audio-related information (e.g., enhanced extended display identification data (E-EDID)) from the connected external device 200', and a consumer electronic control (CEC) capable of transmitting a control signal to the external device 200'.

In particular, the communication interface 120 may be implemented as an HDMI input port supporting the HDMI standard. Each version of the HDMI port has backward compatibility. Therefore, it is possible to connect a source device of a higher standard and an output device of a lower standard to use or vice versa. However, only the function corresponding to the low standard can be used in both cases. For example, even if the electronic apparatus 100 (e.g., a TV) supports a function related to HDMI 2.1, if the external device 200' (e.g., a Blu-ray player) supports a function related to HDMI 2.0, the HDMI 2.0 related function may only be used.

The processor 130 may control the overall operation of the electronic apparatus 100. The processor 130 controls an overall operation of the electronic apparatus 100. The processor 130 may include one or more of a central processing unit (CPU), a digital signal processor (DSP), a microprocessor, a time controller (TCON), a micro processing unit (MPU), a controller, an application processor (AP), a communication processor (CP), an ARM processor, or may be defined in a corresponding term. In addition, the processor 130 may be implemented in a form of a system on chip (SoC) with a built-in processing algorithm, large scale integration (LSI), or a field programmable gate array (FPGA).

The processor 130 may change first information indicating support for a fixed rate link (FRL) in EDID information stored in the memory 110 into second information indicating no support for the FRL based on an event for turning off the electronic apparatus 100. For example, the electronic apparatus 100 may support HDMI 2.1 or higher, and in this case, the EDID information of the electronic apparatus 100 may include first information indicating the support for the fixed rate link (FRL).

In this case, when the source device 100' reads the corresponding EDID information, a signal is output according to the FRL, so that a clock signal is not output, and the electronic apparatus 100 may not monitor a status of turning on/off the source device 100'.

Accordingly, the processor 130 changes the first information indicating the support for the fixed rate link (FRL) in the EDID information to second information indicating the no support for the FRL. For example, the processor 130 may change data by changing or overwriting the first information related to FRL into meaningless data (e.g., zero data), or deleting data of an area where the first information related to the FRL, or the like. However, it is not limited thereto, and the source device 100' may change data in various forms in which the sink device 200' may identify that the FRL is not supported.

After changing the first information into the second information, the processor 130 may provide the second information to a source device connected through the communication interface 120.

For example, the processor 130 may change a hot plug detect signal related to the communication interface 120 from a low status to a high status, that is, toggling. This is to enable the source device 100' to read the changed EDID information.

The hot plug detect signal is a signal standard that identifies whether an HDMI cable is connected or disconnected according to a HDMI standard. When the electronic apparatus 100 is connected to the source device 200' through the HDMI cable, a voltage detected through a specific pin of the HDMI port, that is, a hot plug detect signal may be transmitted to, for example, 5V from 0V. In this case, the source device 200' may recognize that the HDMI cable is connected and read the EDID information of the sink device.

Accordingly, if the processor 130 arbitrarily transits the hot plug detect signal from a low status to a high status, it may have the same effect as an operation in which the HDMI cable is disconnected and then connected.

For example, pins 18 and 19 of 19 pins constituting an HDMI port may perform a function related to the hot plug detect signal. For example, the pins 18 and 19 of the HDMI port provided in the electronic apparatus 100 may be implemented as a configuration of being connected through a switch or having the same effect.

In this case, if a voltage of +5V is applied through the pin 18 of the HDMI port provided in the source device 200', while both HDMI ports are connected through an HDMI cable, the same voltage of +5V may be detected at the pin 19 of the HDMI port provided in the source device 200'. In this case, the source device 200' may recognize that it is connected through the HDMI cable, and read the EDID information of the electronic apparatus 100.

Accordingly, when the EDID information of the memory 110 is updated, the processor 130 may change a switch connecting the pins 18 and 19 of the HDMI port provided in the electronic apparatus 100 into an OFF status and then into an ON status again, so that the processor 130 may transmit the hot plug detect signal of +5V to the source device 200'.

In this case, the source device 200' may detect the hot plug detect signal and read the updated EDID information in the memory 110. In other words, the source device 200' may detect the +5V signal and identify that a new sink device is connected, read the EDID information again to update, and set an output based on the updated EDID information.

However, according to another embodiment of the disclosure, the processor 130 may generate a hot plug detect signal and output it through a specific pin of the HDMI port.

Meanwhile, the processor 130 may change the hot plug detect signal from a low status to a high status and enter a standby mode.

When the electronic apparatus 100 is turned on, the processor 130 may identify a power status of the source device 200' based on clock signal information output from the source device 200'.

According to an embodiment, the processor 130 may monitor a clock signal in the standby mode, and when the electronic apparatus 100 is turned on, the processor 130 may identify the power status of the source device 200' based on the clock signal information output from the source device 200'.

According to another embodiment, when the electronic apparatus 100 is turned on, the processor 130 may start monitoring a clock signal and identify the power status of the source device 200' based on clock signal information output from the source device 200'.

Meanwhile, the clock signal in the standby mode may be monitored by at least one among the processor 130, a microcomputer provided in the processor 130, or a microcomputer provided separately from the processor 130.

For example, at least some power supplied to the processor 130 may be cut off in the standby mode.

According to an example, the processor 130 may include a main CPU and a Micom, and power supplied to the main CPU in the standby mode may be cut off, and the power supplied to the Micom may be maintained or saved. In this case, the Micom may monitor the clock signal output from the source device 200' connected through the communication interface 120.

However, when the main CPU of the processor 130 receives power even in the standby mode, the main CPU may monitor the clock signal.

According to another example, the Micom separate from the processor 130 may be provided, and the power supplied to the processor 130 in the standby mode may be cut off, and the Micom separately provided may monitor the clock signal output from the source device 200 connected through the communication interface 120.

When the source device 200' is identified to be turned-off status, the processor 130 may transmit a control signal for turning on the source device 200', and change the second information into the first information, and change the hot plug detect signal from a low status to a high status.

This is because when the EDID information of the memory 110 of the electronic apparatus 100 maintains the first information even when the source device 200' is turned on, the source device 200' may output TDMS signal based on the first information. In other words, the electronic apparatus 100 may not be able to receive the FRL signal even though the HDMI 2.1 is supported.

Accordingly, the processor 130 may change the second information into the first information and then change the plug detect signal from a low status to a high status, such that the source device 200' reads the second information and outputs the FRL signal based on the second information. According to such output setting, the source device 200' may output an image signal in an HDMI image output signal format optimized for the performance of the electronic apparatus 100.

Meanwhile, the processor 130 may directly transmit the control signal for turning on the source device 200' to the source device 200', but may transmit the corresponding control signal to an external device (e.g., IR Blaster) that communicates with the source device 200'. In this case, the external device may turn on the source device 200' based on the corresponding control signal.

Figure 5A:
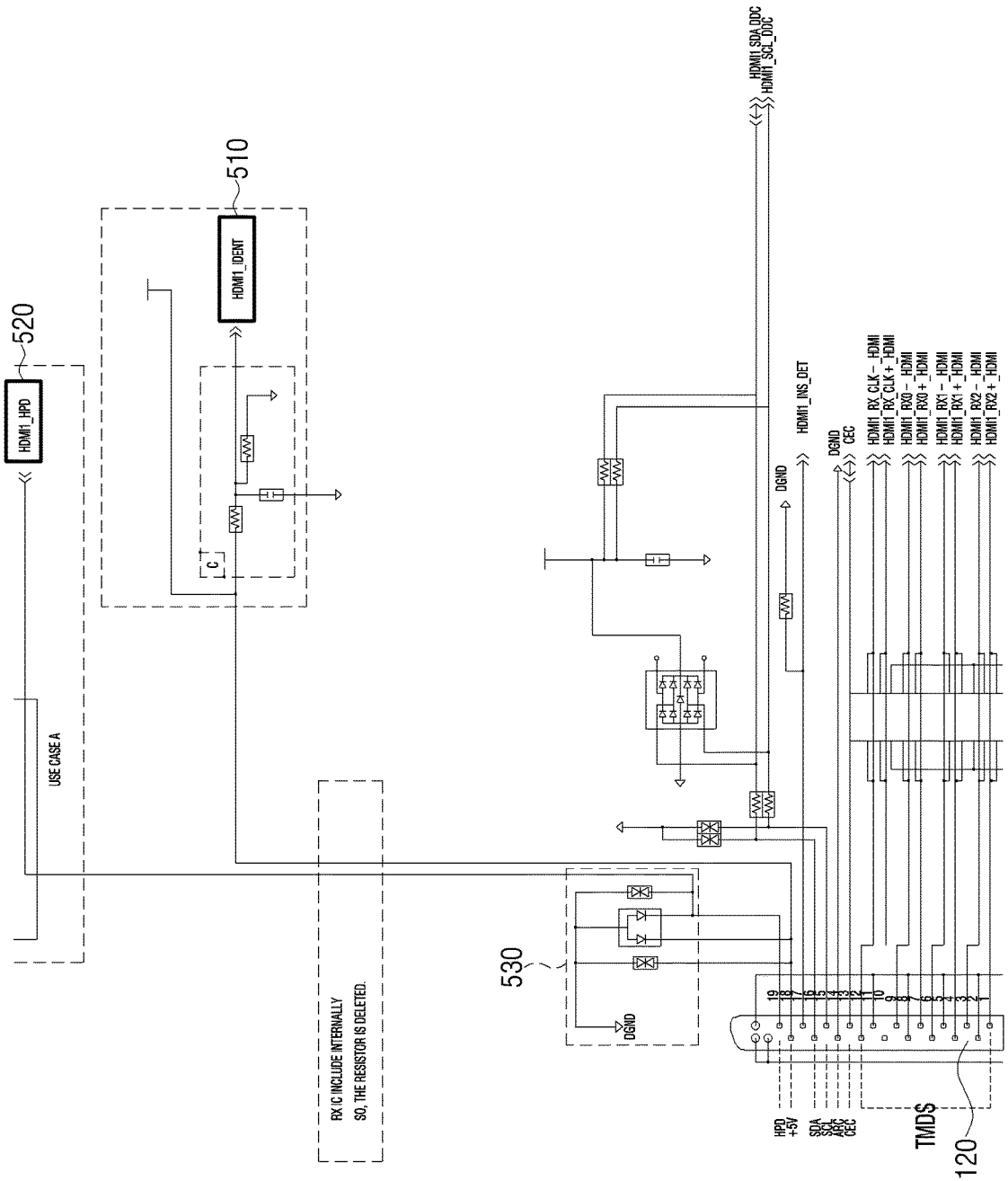
FIGS. 5A and 5B are views illustrating a hot plug detect signal according to an embodiment of the disclosure.
Figure 5B:
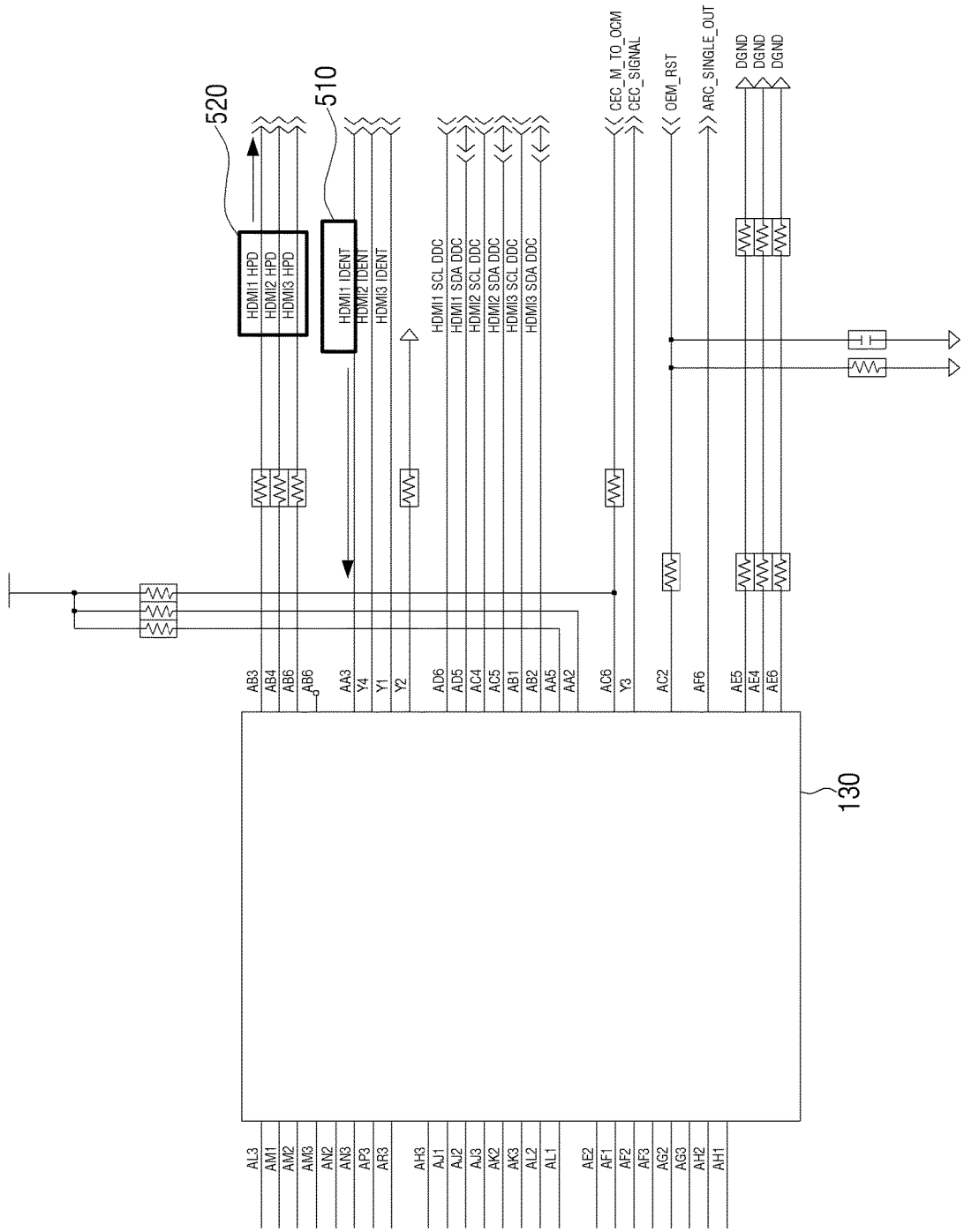

FIGS. 5A and 5B are views illustrating a hot plug detect signal according to an embodiment of the disclosure.

FIG. 5A indicates a relationship between a signal 510 input through the HDMI port 120 and a hot plug detect signal 520 output based thereon.

According to an embodiment of the disclosure, the signal 510 input through pin 18 of the HDMI port 120 as shown in FIG. 5A may be controlled and output as the hot plug detect signal through the processor 130 as shown in FIG. 5B, and may output through pin 19 of the HDMI port 120 as shown in FIG. 5A. However, the hot plug detect signal may be output through a different pin depending on implementation examples.

According to another embodiment of the disclosure, the hot plug detect signal can be generated by processor (130) regardless of the signal 510 input through pin 18 of the HDMI port 120. It is possible. In this case, the processor 130 may output a hot plug detect signal through pin 19 or another pin of the HDMI port 120.

Figure 6:
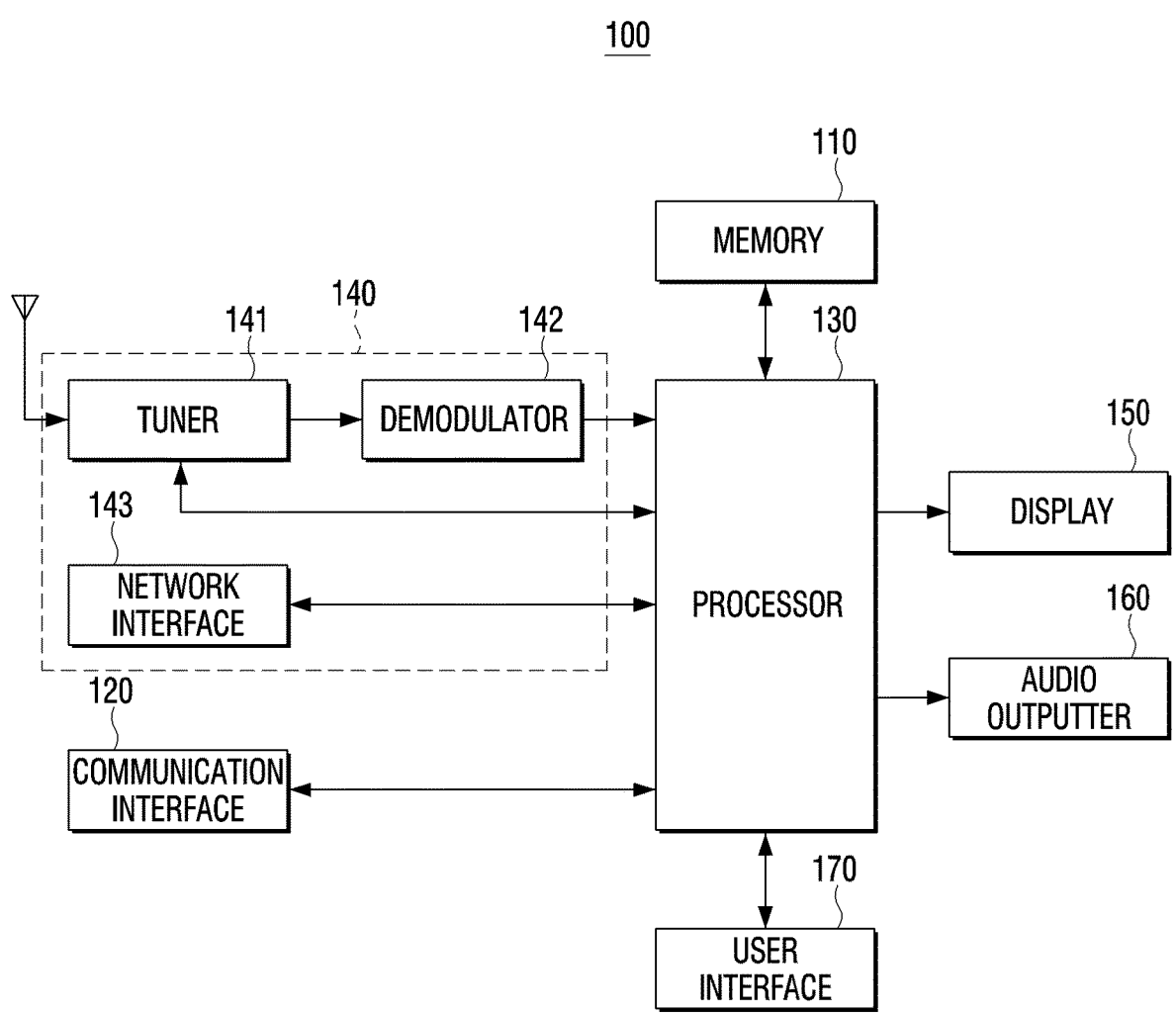
FIG. 6 is a block diagram illustrating a detailed configuration of an electronic apparatus illustrated in FIG. 4.

FIG. 6 is a block diagram illustrating a detailed configuration of the electronic apparatus shown in FIG. 4.

According to FIG. 6, the electronic apparatus 100 includes a memory 110, a communication interface 120, a processor 130, a receiver 140, a display 150, an audio outputter 160, and a user interface 170. In FIG. 6, the elements shown in FIG. 4 will not be described in detail.

In addition to the HDMI port described above, the communication interface 120 may further include various wired/wireless interfaces that can be connected to external devices. For example, wired interfaces such as USB terminal, composite video banking sync (CVBS) terminal, component terminal, S-video terminal (analog), digital visual interface (DVI) terminal, or the like and a wireless interface using a communication protocol such as wireless LAN (WLAN), wireless fidelity (Wi-Fi) direct, Bluetooth, radio frequency identification (FID), infrared communication (IrDA, infrared Data Association), Ultra-wideband (UWB), ZigBee, digital living network alliance (DLNA), or the like.

The memory 110 may store a program for processing and controlling each signal in the processor 130, or may store signal-processed video, audio, or data signals. In addition, the memory 110 may perform a function for temporary storage of a video, audio, or data signal input from the communication interface 120 or the network interface 143.

The receiver 140 may include at least one tuner 141, a demodulator 142, and a network interface 143. In some cases, the receiver 140 may include the tuner 141 and the demodulator 142, but may not include the network interface 143, and vice versa. The tuner 141 receives an RF broadcast signal by tuning a channel selected by the user or all pre-stored channels among radio frequency (RF) broadcast signals received through an antenna. The demodulator 142 may receive and demodulate a digital IF signal (DIF) converted by the tuner 141, and may perform channel decoding or the like.

The network interface 143 provides an interface for connecting the electronic apparatus 100 to a wired/wireless network including an Internet network. For example, the network interface 143 may include an Ethernet terminal and the like for coupling to the wired network, and may use a communication scheme such as wireless local area network (WLAN), Wi-Fi, wireless broadband (Wibro), world interoperability for micro access (Wimax), high speed downlink packet access (HSDPA), or the like for connection with the wireless network.

The display 150 may generate a driving signal by converting an image signal, a data signal, an OSD signal processed by the processor 130, or an image signal, a data signal or the like received from the communication interface 120 into R, G, and B signals, respectively. The display 150 may be realized as a plasma display panel (PDP), a liquid crystal display (LCD), an organic light emitting diode (OLED), a flexible display, a 3-dimensional (3D) display, or the like.

The audio outputter 160 receives a signal processed by the processor 130, for example, a stereo signal, a 3.1 channel signal, or a 5.1 channel signal, and outputs it as audio. The audio outputter 160 may be implemented with various types of speakers.

The user interface 170 transmits a command input by the user to the processor 130 or transmits a signal of the processor 130 to the user. For example, the user interface 170 may be implemented in a form that communicates with a remote control device (not shown) according to various communication methods such as an RF communication method, an infrared (IR) communication method, or the like, or may be implemented in the form of a key panel provided in the electronic apparatus 100.

Figure 7:
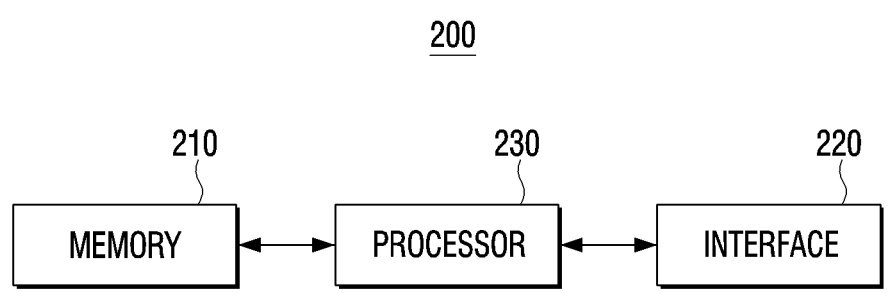
FIG. 7 is a block diagram illustrating a configuration of a source device according to an embodiment of the disclosure.

FIG. 7 is a block diagram illustrating a configuration of a source device according to an embodiment of the disclosure.

As illustrated in FIG. 7, a source device 200 includes a memory 210, a communication interface 220, and a processor 230. The source device 200 may be implemented as the source device 200' shown in FIG. 1.

The memory 210 temporarily or permanently stores information received from the electronic apparatus 100. An implementation form of the memory 210 is similar to the memory 110 illustrated in FIG. 4.

The communication interface 220 performs communication with the electronic apparatus 100. The electronic apparatus 100 may be implemented as the sink device 100' shown in FIG. 1.

The communication interface 220 may be implemented with the same HDMI port as the communication interface 110 shown in FIG. 3. In addition, the implementation form of the communication interface 220 is similar to the communication interface 110 illustrated in FIG. 6.

When a hot plug detect signal related to the communication interface 220 changes from a low status into a high status, the processor 230 may read EDID information stored in the memory 110 of the electronic apparatus 100. In addition, the processor 230 transmits an image signal to the electronic apparatus 100 in an output format corresponding to the EDID information read through the communication interface 220.

According to an embodiment of the disclosure, the processor 230 may detect multiple hot plug detect signals.

Specifically, according to an embodiment of the disclosure, as the electronic apparatus 100 is turned off, the first information is changed into the second information, and the hot plug detection signal is converted to a low status and then transitions to a high status, and thus the processor may detect a first hot plug signal that transitions from low to high status. In this case, the processor 230 may read the second information indicating no support for FRL written to the memory, and transmit the image signal to the electronic apparatus in an output format corresponding to the read second information, that is, the FRL format. Accordingly, the source device 200 may output a signal in the output format corresponding to the second information, that is, a TMDS format.

As the electronic apparatus 100 is turned on, the second information is changed to the first information, and the hot plug detect signal is converted to a low status and transitions to a high status, the processor may detect a second hot plug signal that transitions to the high status from the low status. Accordingly, the processor 230 may read the first information written to the memory 110 and transmit an image signal to the electronic apparatus 100 in an output format corresponding to the read first information, that is, an FRL format.

Figure 8:
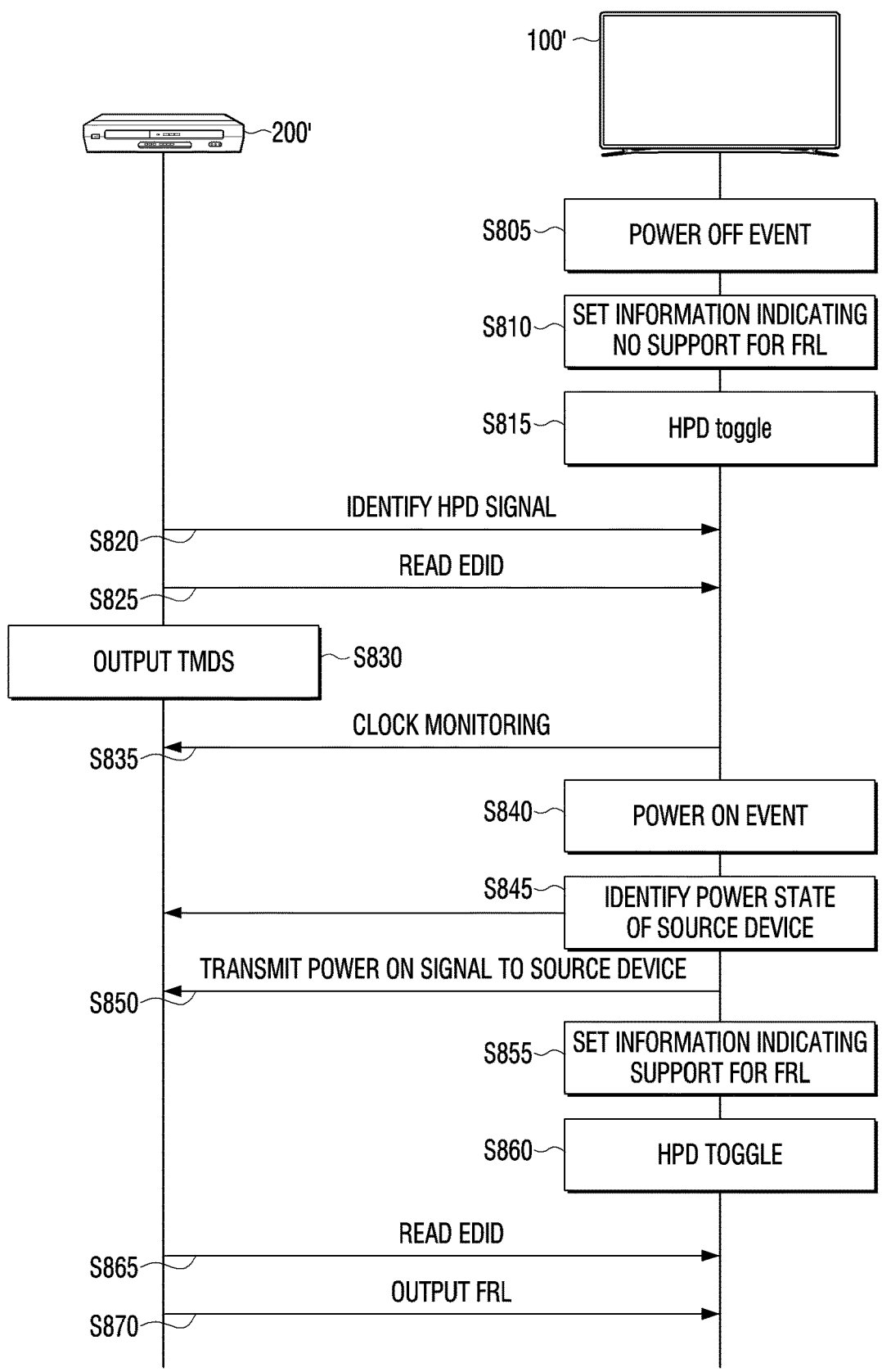
FIG. 8 is a sequence diagram illustrating an operation relationship between a source device and a sink device according to an embodiment of the disclosure.

FIG. 8 is a sequence diagram illustrating an operation relationship between a source device and a sink device according to an embodiment of the disclosure.

According to the sequence diagram shown in FIG. 8, when an event for turning off occurs (S805), the sink device 100' may set first information indicating support for a FRL in EDID information stored in the memory as second information indicating no support for the FRL (S810).

The sink device 100' toggles a HPD signal related to a communication interface connected to the source device 200' from a low status to a high status (S815). Then, the sink device 100' enters a standby mode.

When the toggling of the HPD signal is identified (S820), the source device 200' accesses a memory of the sink device 100' to read the EDID information (S825).

In this case, since the source device 200' reads information indicating no support for the FRL, a TMDS is output (S830). Accordingly, the sink device 100' may monitor the TMDS clock signal in the standby mode (S835).

When the event for turning off occurs (S840), the sink device 100' may identify the power status of the source device 200' based on monitoring information of the TMDS clock signal (S845). When the source device 200' is identified as being turned on, the sink device 100' may not operate, but when the source device 200' is identified as being turned off, the sink device 100' may transmit a signal for turning on the source device 200' to the source device 200' or an external control device (not shown) (S850).

The sink device 100' may change the second information indicating no support for the FRL into the first information indicating support for the FRL (S855), and toggle the HPD signal from a low status to a high status (S860).

In this case, the source device 200' may identify the toggling of the HPD signal and access the memory of the sink device 100' to read the EDID information (S865). Since the source device 200' reads information indicating support for the FRL, the FRL may be output (S830). Accordingly, the sink device 100' may receive a signal of HDMI 2.1 or higher.

Figure 9:
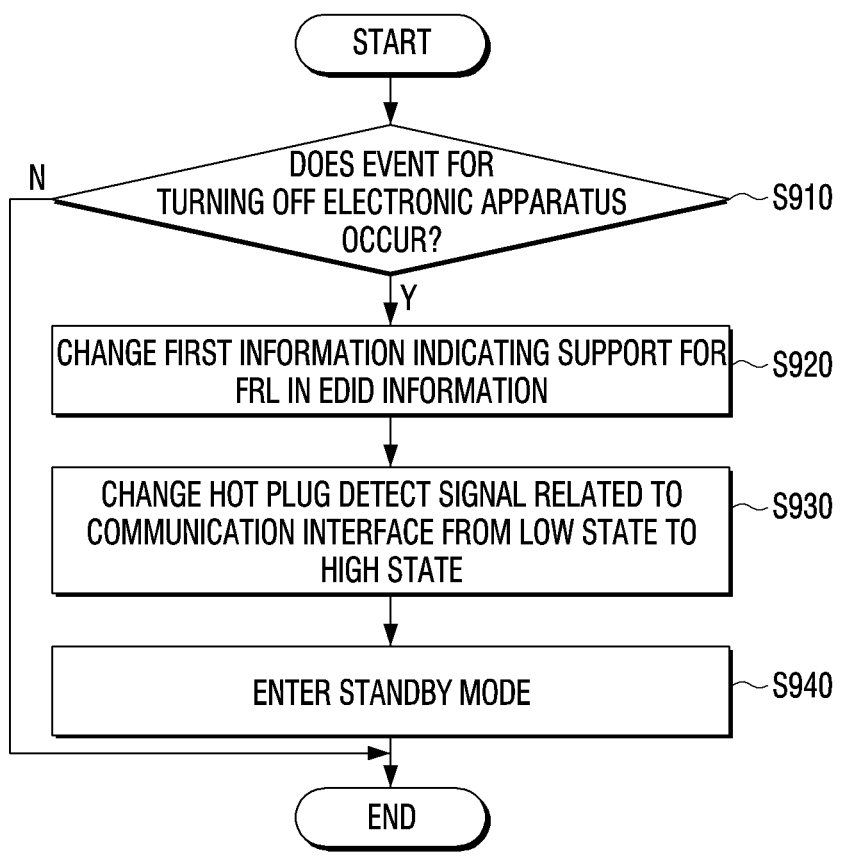
FIG. 9 is a flowchart illustrating a method of controlling an electronic apparatus according to an embodiment of the disclosure.

FIG. 9 is a flowchart illustrating a method of controlling an electronic apparatus according to an embodiment of the disclosure.

According to a method of controlling an electronic apparatus shown in FIG. 9, when an event for turning off the electronic apparatus occurs (S910: Y), first information indicating support for a FRL in EDID information stored in a memory is changed into second information indicating no support for the FRL (S920).

The second information may be provided to the source device connected through the communication interface (S930).

According to an embodiment, the electronic apparatus 100 may change a hot plug detect signal related to a communication interface connected to a source device from a low status to a high status, and enter a standby mode.

In addition, according to the method, when the electronic apparatus 100 is turned on, a power status of the source devices 200 and 200' may be identified based on clock signal information output from the source device.

According to an embodiment, the electronic apparatus 100 may monitor a clock signal in the standby mode, and when the electronic apparatus 100 is turned on, the apparatus 100 may identify a power status of the source device 200' based on the clock signal information output from the source devices 200 and 200'. The clock signal may be a transition minimized differential signaling (TMDS) clock signal.

According to another embodiment, when the electronic apparatus 100 is turned on, a clock signal monitoring may be begun and the power status of the source devices 200 and 200' may be identified based on the clock signal information output from the source devices 200 and 200'.

In addition, according to the control method, when the source devices 200 and 200' are identified as being turned off, a control signal for turning on the source device may be transmitted, the second information may be changed into the first information, and the hot plug detect signal may be changed from a low status to a high status. In this case, a control signal may be transmitted to an external device that communicates with the source device, or a control signal may be transmitted to the source device.

Meanwhile, the electronic apparatus and the source device may support high-definition multimedia interface (HDMI) 2.1 or higher. In this case, the HDMI 2.1 or higher may support both TMDS and FRL.

As described above, according to various embodiments of the disclosure, even if the source device is a device that supports FRL, the sink device may identify a power status of the source device, and the user may view an optimal UHD screen or HDR screen.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

Various exemplary embodiments described above may be embodied in a recording medium that may be read by a computer or a similar apparatus to the computer by using software, hardware, or a combination thereof. In some cases, the embodiments described herein may be implemented by the processor 130 itself. In a software configuration, various embodiments described in the specification such as a procedure and a function may be embodied as separate software modules. The software modules may respectively perform one or more functions and operations described in the present specification.

Computer instructions for performing a processing operation of the electronic apparatus 100 according to various embodiments of the disclosure described above may be stored in a non-transitory computer-readable medium. When a computer instruction stored in such a non-transitory computer-readable medium is executed by a processor of a specific device, the processor may allow a specific device to perform a processing operation in the electronic apparatus 100 according to the above-described various embodiments.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus comprising:
    a memory;
    a communication interface; and
    a processor configured to:
        change, based on an event for turning off the electronic apparatus, first information indicating support for a fixed rate link (FRL) in EDID (Extended Display Identification Data) information stored in the memory into second information indicating no support for the FRL and change a hot plug detect signal related to the communication interface from a low status to a high status and enter a standby mode, and
        provide the second information to a source device connected through the communication interface,
    wherein the processor is further configured to, based on the source device being identified as being turned off, transmit a control signal for turning on the source device, change the second information into the first information, and change the hot plug detect signal from the low status to the high status.

2. The apparatus of claim 1, wherein the processor is configured to, based on the electronic apparatus being turned on, identify a power status of the source device based on clock signal information output from the source device.

3. The apparatus of claim 1, wherein the processor is configured to transmit the control signal to an external device that performs communication with the source device, or transmit the control signal to the source device.

4. The apparatus of claim 1, further comprising:
    a Micom,
    wherein the Micom is configured to, based on the processor entering a standby mode, monitor a clock signal output from the source device connected through the communication interface.

5. The apparatus of claim 4, wherein the clock signal is a transition minimized differential signaling (TMDS) clock signal.

6. The apparatus of claim 1, wherein the electronic apparatus and the source device support high-definition multimedia interface (HDMI) 2.1 or higher, and
    wherein the HDMI 2.1 or higher supports both TMDS and FRL.

7. An electronic system comprising a source device and a sink device, the system comprising:
    a source device; and
    a sink device configured to change, based on an event for turning off the electronic apparatus, first information indicating support for a fixed rate link (FRL) in EDID (Extended Display Identification Data) information stored in a memory into second information indicating no support for the FRL, change a hot plug detect signal related to the communication interface from a low status to a high status and enter a standby mode, and provide the second information to a source device connected through a communication interface,
    wherein the sink device is configured to, based on the source device being identified as being turned off, transmit a control signal for turning on the source device, change the second information into the first information and change the hot plug detect signal from the low status to the high status, and
    wherein the source device is configured to read EDID information stored in a memory of the sink device, and output an image signal based on the first information included in the EDID information.

8. The system of claim 7, wherein the sink device is configured to, based on the electronic apparatus being turned on, identify a power status of the source device based on clock signal information output from the source device.

9. A method of controlling an electronic apparatus, comprising:
    based on an event for turning off the electronic apparatus, changing first information indicating support for a fixed rate link (FRL) in EDID information stored in a memory into second information indicating no support for the FRL and changing a hot plug detect signal related to the communication interface from a low status to a high status and entering a standby mode; and
    providing the second information to a source device connected through a communication interface,
    the method further comprising;
        based on the source device being identified as being turned off, transmitting a control signal for turning on the source device, changing the second information into the first information and changing the hot plug detect signal from the low status to the high status.

10. The method of claim 9, further comprising:
    based on the electronic apparatus being turned on, identifying a power status of the source device based on clock signal information output from the source device.

* * * * *